United States Patent
Hu et al.

(10) Patent No.: US 11,444,335 B2
(45) Date of Patent: Sep. 13, 2022

(54) HIGH VOLTAGE RECHARGEABLE Zn—MnO$_2$ BATTERY

(71) Applicant: TIANJIN UNIVERSITY, Tianjin (CN)

(72) Inventors: Wenbin Hu, Tianjin (CN); Cheng Zhong, Tianjin (CN); Bin Liu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 16/627,284

(22) PCT Filed: Feb. 11, 2019

(86) PCT No.: PCT/CN2019/074801
§ 371 (c)(1),
(2) Date: Dec. 28, 2019

(87) PCT Pub. No.: WO2020/155190
PCT Pub. Date: Aug. 6, 2020

(65) Prior Publication Data
US 2021/0408610 A1    Dec. 30, 2021

(30) Foreign Application Priority Data
Jan. 31, 2019 (CN) .......................... 201910108404.5

(51) Int. Cl.
*H01M 4/42* (2006.01)
*H01M 4/50* (2010.01)
(Continued)

(52) U.S. Cl.
CPC ............. *H01M 10/38* (2013.01); *H01M 4/42* (2013.01); *H01M 4/50* (2013.01); *H01M 50/46* (2021.01);
(Continued)

(58) Field of Classification Search
CPC ...... H01M 10/38; H01M 50/46; H01M 50/50; H01M 4/42; H01M 2300/0088
See application file for complete search history.

(56) References Cited

U.S. PATENT DOCUMENTS

2007/0122704 A1* 5/2007 Daniel-Ivad .......... H01M 4/244
429/224
2019/0036147 A1* 1/2019 Yuan ..................... H01M 10/02
(Continued)

FOREIGN PATENT DOCUMENTS

| CN | 1078331 A | 11/1993 |
|---|---|---|
| CN | 105140575 A | 12/2015 |
| JP | H04101358 A | 4/1992 |
| KR | 20000015510 A * | 3/2000 |

OTHER PUBLICATIONS

EPO machine generated English translation of CN 105140575 (Year: 2015).*
(Continued)

*Primary Examiner* — Christopher P Domone
*Assistant Examiner* — Kimberly Wyluda
(74) *Attorney, Agent, or Firm* — Dragon Sun Law Firm, PC; Jinggao Li, Esq.; Nathaniel Perkins (57) ABSTRACT

The invention discloses a high voltage rechargeable Zn—MnO$_2$ battery. The structure of the Zn—MnO$_2$ battery includes zinc electrode/alkaline electrolyte/ion exchange membrane/acid electrolyte/MnO$_2$ electrode. The ion exchange membrane comprises a cation exchange membrane, an anion exchange membrane or a proton exchange membrane. According to the invention, by using a composite electrolyte system (alkaline electrolyte/ion exchange membrane/acid electrolyte), a high voltage rechargeable Zn—MnO$_2$ battery is obtained. According to the invention, an open circuit voltage of up to 2.7V is obtained, greatly improving the discharge voltage, and at the same time increasing the discharge capacity and enabling cyclic charge
(Continued)

and discharge. The invention is of great importance in science research, beneficial to society and economics.

16 Claims, 3 Drawing Sheets

(51) Int. Cl.
*H01M 10/0567* (2010.01)
*H01M 10/38* (2006.01)
*H01M 50/46* (2021.01)

(52) U.S. Cl.
CPC ............... *H01M 10/0567* (2013.01);qa *H01M 2300/0088* (2013.01)

(56) References Cited

U.S. PATENT DOCUMENTS

2020/0365953 A1* 11/2020 Pham .................... H01M 4/623
2021/0143386 A1* 5/2021 Yabuzaki .............. H01M 4/244

OTHER PUBLICATIONS

EPO machine generated English translation of KR-2000-0015510-A (Year: 2000).*
International Search Report of PCT/CN2019/074801.
Written Opinion of PCT/CN2019/074801.

* cited by examiner

HIGH VOLTAGE RECHARGEABLE ZN—MNO$_2$ BATTERY

CROSS-REFERENCE TO RELATED APPLICATIONS

This application is a national stage application of PCT Application No. PCT/CN2019/074801. This Application claims priority from PCT Application No. PCT/CN2019/074801, filed Feb. 11, 2019 and CN Application No. 201910108404.5, filed Jan. 31, 2019, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The invention relates to a Zn—MnO$_2$ battery, in particular to a high voltage rechargeable Zn—MnO$_2$ battery.

BACKGROUND

Due to reasonable structural design and low price for raw materials, Zn—MnO$_2$ batteries have been widely used in society since being invented in the 1960s.

Currently, Zn—MnO$_2$ batteries on the market are mainly classified into Zn—MnO$_2$ dry battery and alkaline Zn—MnO$_2$ battery. The working principles are respectively shown as follows.

The working principle of Zn—MnO$_2$ dry battery is as follows:

Total reaction: $Zn+2MnO_2+2NH_4Cl=Zn(NH_3)_2Cl_2+2MnOOH$

Negative electrode: $Zn+2NH_4Cl=Zn(NH_3)_2Cl_2+2H^++2e^-$

Positive electrode: $2MnO_2+2H_2O+2e^-=2MnOOH+2OH^-$

In the Zn—MnO$_2$ dry battery, the Zn electrode potential is stable at 0.8 V, and the MnO$_2$ electrode potential is between 0.7 V and 1.0 V. Therefore, the Open Circuit Voltage of the Zn—MnO$_2$ dry battery is 1.5 V to 1.8 V.

The working principle of the alkaline Zn—MnO$_2$ battery is as follows:

Total reaction: $Zn+2MnO_2+H_2O=2MnOOH+ZnO$

Negative electrode: $Zn+2OH^-=ZnO+H_2O+2e^-$

Positive electrode: $2MnO_2+2H_2O+2e^-=2MnOOH+2OH^-$

In the alkaline Zn—MnO$_2$ battery, the Open Circuit Voltage of the battery is about 1.55V.

It can be seen that for both the earlier Zn—MnO$_2$ dry battery with ammonium chloride and zinc chloride as the electrolyte, or the later alkaline Zn—MnO$_2$ battery with potassium hydroxide as the electrolyte, the open-circuit voltage is between 1.5V and 1.8V, and the working voltage is between 1.25V and 1.55V. Moreover, the valence state of the MnO$_2$ electrode in the existing Zn—MnO$_2$ battery during the discharge process is changed from +4 valence to +3 valence, meaning that a single MnO$_2$ molecule can only provide one electron. Moreover, the MnO$_2$ electrode undergoes a solid-state transition during operation, and the generated MnOOH would cover the surface of the electrode, which affects the further reaction. Besides, the electrode polarization effect would greatly reduce the reaction voltage, while at the same time degrade battery reversibility. Due to these problems, the Zn—MnO$_2$ battery can only be applied in some low-power electronic products such as flashlights, MP3, radios, etc., which cannot meet the growing needs of consumers.

The defects in Zn—MnO$_2$ batteries exist in many chemical batteries. For example, the lead dioxide electrode in a lead-acid battery is converted into solid lead sulfate during discharge, which would cover over the lead dioxide electrode. When being charged, only a portion of the solid lead sulfate produced can be oxidized to lead dioxide. As a result, the lead-acid battery would undergo electrode sulphation during operation, which limits the performance and life of the lead-acid battery.

In order to cope with these defects of Zn—MnO$_2$ battery and even chemical battery, it is necessary to fundamentally change the charging and discharging mechanism of Zn—MnO$_2$ battery, and to find new electrochemical reactions and introduce them into the battery. However, current research focuses more on the internal amendments in the applied battery reaction, which cannot fundamentally solve the problem.

Therefore, a heretofore unaddressed need exists in the art to address the aforementioned deficiencies and inadequacies.

SUMMARY

The present invention aims to overcome the problems of low voltage, capacity, and reversibility of the existing Zn—MnO$_2$ battery, and to provide a high-voltage rechargeable Zn—MnO$_2$ battery.

The object of the present invention is achieved by the following technical solutions.

The present invention relates to a high voltage rechargeable Zn—MnO$_2$ battery, the structure of which includes a zinc electrode/an alkaline electrolyte/an ion exchange membrane/an acid electrolyte/a MnO$_2$ electrode.

Preferably, the zinc electrode is prepared by using a zinc foil, a zinc paste, or zinc powder.

Preferably, the alkaline electrolyte includes an alkaline liquid electrolyte, an alkaline solid electrolyte, an alkaline polymer electrolyte or an alkaline gel electrolyte.

Preferably, the alkaline liquid electrolyte includes a potassium hydroxide solution, a lithium hydroxide solution or a sodium hydroxide solution with or without an additive, and the additive includes zinc chloride, zinc sulfate, zinc nitrate, zinc acetate or zinc oxide.

Preferably, the alkaline liquid electrolyte has a concentration of an alkali metal hydroxide from 200 g/L to 600 g/L. Since the potential of the zinc electrode is related to the pH value, thus in the present invention, when the concentration of the alkali metal hydroxide is lower than the range, the battery voltage is low and thus is not conducive to the dissolution of the reaction product at the zinc electrode; when the concentration of the alkali metal hydroxide is higher than the range, the electrolyte concentration is too large for ion diffusion and conduction in the solution, which would accelerate electrode corrosion. In consideration of both the battery voltage and the electrolyte ion conductivity, more preferably, the concentration of the alkali metal hydroxide in the alkali liquid electrolyte ranges from 300 g/L to 400 g/L.

Preferably, the electrolyte in the alkaline gel electrolyte is one or more of potassium hydroxide, sodium hydroxide, and lithium hydroxide, and a gel skeleton is one or a mixture of two or more of polyvinyl alcohol, polyacrylic acid, potassium polyacrylate, and polyethylene oxide. The electrolyte is added to the alkaline gel electrolyte as a raw material in the form of a solution.

Preferably, the alkali metal hydroxide in the liquid portion of the alkaline gel electrolyte is from 100 g/L to 300 g/L. When the alkali metal hydroxide concentration is lower than the range, the resulting alkaline gel electrolyte has a relatively low pH, and the resulting battery voltage is relatively low. When the alkali metal hydroxide concentration is above this range, the alkaline gel electrolyte can not be formed.

In order to maximize the alkali metal hydroxide concentration in the liquid portion of the alkaline gel electrolyte and to ensure gel electrolyte formability, more preferably, the alkali metal hydroxide in the liquid portion of the alkaline gel electrolyte ranges from 250 g/L to 300 g/L.

More preferably, the alkaline electrolyte is an aqueous solution of 300 g/L~400 g/L potassium hydroxide+40 g~60 g/L zinc acetate, or a polyacrylic acid-polyvinyl alcohol-potassium hydroxide-zinc acetate gel electrolyte with 250 g/L~300 g/L potassium hydroxide+40 g~60 g/L zinc acetate and with a mass ratio of acrylic acid to polyvinyl alcohol between 5:1~20:1. The alkaline electrolyte of the composition takes into consideration all the three of high ion conductivity, high hydroxide concentration, and high reversibility of the zinc electrode.

Preferably, said ion exchange membrane includes a cation exchange membrane, an anion exchange membrane, or a proton exchange membrane. According to the present invention, the ion exchange membrane is added between the acidic electrolyte and the alkaline electrolyte to limit the contact between the hydrogen ions and the hydroxyl ions, thereby ensuring the normal operation of the battery. The ion exchange membrane may be a proton exchange membrane, or an anion exchange membrane, for permeation of hydroxyl ions, and a cation exchange membrane. And the selection of the specific cation exchange membrane is related to the type of the alkali metal ion in the alkaline liquid electrolyte. That is, the cation exchange membrane is a cation exchange membrane that allows the permeation of alkali metal ions in the alkaline liquid electrolyte. For example, when the electrolyte in the alkaline gel electrolyte contains lithium hydroxide, it is selectable to add a lithium-ion exchange membrane between the acidic electrolyte and the alkaline electrolyte, allowing only lithium ions to pass through, thereby avoiding acid and alkali electrolyte neutralization while achieving electricity conductivity, ensuring the normal operation of the battery.

Preferably, the acid electrolyte includes an acidic liquid electrolyte, an acidic solid electrolyte, an acidic polymer electrolyte, or an acidic gel electrolyte.

Preferably, the acidic liquid electrolyte includes a sulfuric acid solution, a phosphoric acid solution, a hydrochloric acid solution, or a nitric acid solution with or without an additive, and the additive includes but is not limited to manganese sulfate, manganese nitrate, manganese chloride, and manganese acetate.

Preferably, the acid liquid electrolyte has an acid concentration of 50 g/L~300 g/L. In the present invention, when the acid concentration is lower than the range, the $MnO_2$ electrode terminal voltage is too low, and when the acid concentration is higher than the range, the $MnO_2$ has a dissolution problem, and the electrolyte conductivity is relatively low.

In consideration of both the hydrogen ion concentration in the solution and the ion conductivity, more preferably, the acid concentration ranges from 50 g/L to 100 g/L.

Preferably, the acidic gel electrolyte includes a polyvinyl alcohol-sulfate electrolyte or a polyvinyl alcohol-phosphoric acid electrolyte.

In order to maximize the hydrogen ion concentration in the acidic gel electrolyte and to ensure gel electrolyte formability, it is preferred that the acid content in the liquid portion of the acidic gel electrolyte ranges from 100 g/L to 200 g/L.

More preferably, the acidic electrolyte is an aqueous solution of 50 g/L~100 g/L sulfuric acid+150 g~200 g/L manganese sulfate, or a polyvinyl alcohol gel electrolyte of 100 g/L~200 g/L sulfuric acid+50 g~100 g/L manganese sulfate. The acidic electrolyte of the composition can take into consideration all the three of high ion conductivity, high hydrogen ion concentration, and high reversibility of the $MnO_2$ electrode.

Preferably, the $MnO_2$ electrode includes a $MnO_2$ powder electrode or an electrodeposited $MnO_2$ electrode.

In the high voltage rechargeable Zn—$MnO_2$ battery system of the present invention, the electrode reaction of the $MnO_2$ electrode in the acidic electrolyte is: positive electrode reaction: $MnO_2+4H^++2C=Mn^{2+}+2H_2O$, and the standard electrode potential for the reaction is 1.224 V. In the electrode reaction, the $MnO_2$ electrode completely converts into divalent manganese ions and leaves from the electrode after discharging, avoiding the problem in the conventional chemical battery where further discharge is affected due to the produced solid substance that covers the surface of the electrode. In addition, in the discharge reaction, $MnO_2$ is converted from +4 valence to +2 valence, and a single $MnO_2$ molecule can release two electrons, which greatly increases the energy density of the $MnO_2$ electrode. This electrode reaction is not found in various kinds of battery systems. In the alkaline electrolyte, the negative electrode reaction: $Zn+2OH^-=ZnO+H_2O+2C$, and the standard electrode potential of the Zn electrode is −1.215V. Therefore, a composite electrolyte using an alkaline electrolyte and an acidic electrolyte can achieve an open circuit voltage above 2.45V. Meanwhile, since the acidic electrolyte cannot directly contact with the alkaline electrolyte (for example, direct contact would cause neutralization, resulting a neutral electrolyte, thereby causing the battery to be inoperable), an ion exchange membrane is added between the acidic electrolyte and the alkaline electrolyte in the present invention, to restrict the contact between hydrogen ions and hydroxyl ions (in the case of a proton exchange membrane, the neutralization rate of hydrogen ions and hydroxyl is determined by the discharge current, thereby maintaining stable operation of the battery, and in the case of using a lithium-ion exchange membrane, only lithium ions are allowed to permeate, avoiding neutralization of acid and alkali electrolytes, while achieving electrical conductivity), thereby ensuring normal operation of the battery.

Compared with the prior art, the present invention brings the following beneficial effects.

According to the invention, by introducing a two-electron reaction of $MnO_2$ into the battery and using a composite electrolyte of an alkaline electrolyte/ion exchange membrane/acid electrolyte, the discharge voltage, power density, energy density and reversibility of the zinc-manganese battery is greatly improved, and the major problem that is perplexing in the field of chemical battery is solved.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Other features, objects, and advantages of the present invention will become apparent from the detailed description of the non-limiting embodiments with reference to accompanying drawings.

Among them, 1 refers to a $MnO_2$ electrode, 2 refers to an acid electrolyte, 3 refers to an ion exchange membrane, 4 refers to an alkaline electrolyte, and 5 refers to a zinc electrode.

DETAILED DESCRIPTION

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Embodiments of the invention are illustrated in detail hereinafter with reference to accompanying drawings. It should be understood that specific embodiments described herein are merely intended to explain the invention, but not intended to limit the invention.

The invention will now be described in detail in conjunction with the specific embodiments and drawings. The following embodiments are intended to facilitate understanding of the invention by those skilled in the art, but are not intended to limit the invention in any way. It should be noted that a number of variations and modifications may be made by those skilled in the art without departing from the inventive concept, which are all within the scope of protection of the present invention.

The high voltage rechargeable $Zn-MnO_2$ battery of the invention has the structure of the zinc electrode/alkaline electrolyte/ion exchange membrane/acid electrolyte/$MnO_2$ electrode. The specific preparation steps are as follows.

1. Preparation of the zinc electrode, in which a zinc foil or a zinc paste can be used directly.

2. Preparation of the alkaline electrolyte, in which an alkaline electrolyte or an alkaline gel electrolyte can be used directly.

The alkaline electrolyte includes, but is not limited to, a potassium hydroxide solution, a lithium hydroxide solution or a sodium hydroxide solution with or without an additive, in which the alkali metal hydroxide solution has a concentration of 10 g/L to 1000 g/L. The additive includes, but is not limited to, zinc chloride, zinc sulfate, zinc nitrate, zinc acetate, zinc oxide, and the like.

The electrolyte in the alkaline gel electrolyte is one or more of potassium hydroxide, sodium hydroxide, and lithium hydroxide. The gel matrix is one or a mixture of at least two of polyvinyl alcohol, polyacrylic acid, potassium polyacrylate, polyethylene oxide. The electrolyte is added to the alkaline gel electrolyte as a raw material in the form of a solution.

3. Ion exchange membrane: including but not limited to the following: cation exchange membrane, anion exchange membrane, proton exchange membrane.

4. Preparation of the acid electrolyte, in which an acid electrolyte or an acidic gel electrolyte can be used directly.

The acid electrolyte includes, but is not limiting to, sulfuric acid solution, phosphoric acid solution, hydrochloric acid solution, nitric acid solution, and the like with or without an additive, where the acid concentration is from 5 g/L to 1000 g/L. Such additive includes, but is not limited to, manganese sulfate, manganese nitrate, manganese chloride, manganese acetate, and the like.

The acidic gel electrolyte includes, but is not limited to, the following: polyvinyl alcohol-sulfuric acid ($PVA-H_2SO_4$) electrolyte, polyvinyl alcohol-phosphoric acid ($PVA-H_3PO_4$) electrolyte.

5. $MnO_2$ electrode, in which the $MnO_2$ powder is mixed with a conductive agent and an additive.

For specific details, please refer to the following embodiments.

Embodiment 1

The embodiment relates to a high voltage rechargeable $Zn-MnO_2$ battery, which has a structure of zinc electrode/alkaline electrolyte/ion exchange membrane/acid electrolyte/$MnO_2$ electrode. The specific preparation steps are as follows.

1) Preparation of the zinc electrode, in which a zinc plate is taken as the zinc electrode.

2) Preparation of the alkaline electrolyte, in which 3 g of polyvinyl alcohol is heated and dissolved in 24 mL of water, to form a uniform and stable solution, and then the solution is poured into 6 mL of 500 g/L potassium hydroxide solution+200 g/L zinc acetate solution. After stirring evenly, the resulted solution is placed in a freezer. Subsequently, the solution is taken out to melt for use, resulting in an alkaline gel electrolyte of polyvinyl alcohol-potassium hydroxide-zinc acetate, in which the potassium hydroxide concentration in the liquid portion is 100 g/L, and the zinc acetate concentration is 40 g/L.

3) Ion exchange membrane, in which the ion exchange membrane of the high-voltage $Zn-MnO_2$ battery system of the present embodiment may be a proton exchange membrane, an anion exchange membrane, a cation exchange membrane or the like. Specifically, in the present embodiment, a sulfonic acid-based cation exchange membrane is used.

4) Preparation of the acid electrolyte, in which 3 g of polyvinyl alcohol is heated and dissolved in 24 mL of water to form a uniform and stable solution, and then 6 mL of 500 g/L sulfuric acid solution is poured thereinto. After stirring evenly, the resulted solution is placed in a freezer. Then it is taken out to melt for use, resulting in a polyvinyl alcohol-sulfate acid gel electrolyte having a sulfuric acid concentration of 100 g/L in the liquid portion.

5) Preparation of the $MnO_2$ electrode, in which 8 g of $MnO_2$ powder is uniformly mixed with 1 g of graphite powder and 1 g of polyvinylidene fluoride, and the obtained mixture is added to 0.4 g of a 100 g/L sulfuric acid solution, stirred, and dried to serve as a $MnO_2$ electrode.

Figure 1:
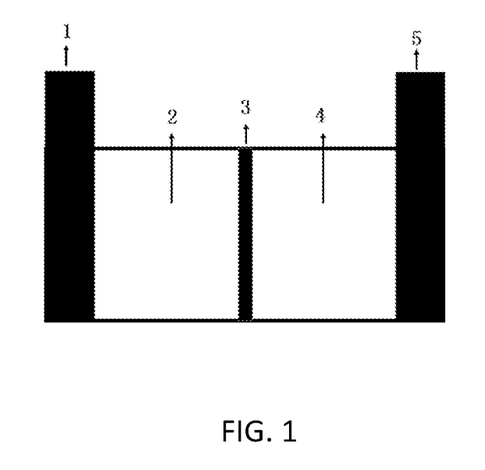
FIG. 1 is a schematic structural view of a high voltage rechargeable $Zn-MnO_2$ battery of the present invention.

6) Battery assembly, in which the battery is formed with a structure of the zinc electrode/alkaline electrolyte/ion exchange membrane/acid electrolyte/MnO₂ electrode in combination. Its schematic structure is shown in FIG. 1.

The resulted battery has an open circuit voltage above 2.6V, and a working platform voltage above 2.5V. The resulted battery is chargeable and dischargeable, with the charging voltage under 3V, and can be cycled stably for more than 50 cycles.

Embodiment 2

The embodiment relates to a high voltage rechargeable Zn—MnO₂ battery, which has the structure of zinc electrode/alkaline electrolyte/ion exchange membrane/acid electrolyte/MnO₂ electrode. The specific preparation steps are as follows.

1) Preparation of the zinc electrode, in which 10 g of zinc powder is added into 4 g of lithium hydroxide solution with a mass fraction of 20 wt %, together with 0.04 g of sodium polyacrylate adhesive, then the mixture is stirred evenly and left at room temperature for 12 hours to obtain a pasted zinc electrode.

2) Preparation of the alkaline liquid electrolyte, in which 20 g of lithium hydroxide and 4 g of zinc oxide are dissolved in 100 mL of deionized water to obtain the alkaline liquid electrolyte.

3) Ion exchange membrane, in which the ion exchange membrane of the high-voltage Zn—MnO₂ battery system of the present embodiment may be a proton exchange membrane, an anion exchange membrane, a cation exchange membrane or the like. Specifically, in this embodiment, a quaternary ammonium anion exchange membrane is employed.

4) Preparation of the acidic liquid electrolyte, in which 10 g of phosphoric acid and 20 g of manganese sulfate monohydrate are dissolved in 100 mL of water to obtain an acidic liquid electrolyte.

5) Preparation of the electrodeposited MnO₂ electrode, in which 20 g of manganese sulfate monohydrate and 20 g of sulfuric acid are dissolved in 100 mL of water, and a graphite sheet is employed as the working electrode and the counter electrode. Upon using a DC power source to deposit at 1.8V for 3600 seconds, the anode piece in the electrolytic cell is taken out, rinsed, and dried, thus resulting in an electrodeposited MnO₂ electrode.

6) Battery assembly, in which the battery is formed in the structure of zinc electrode/alkaline electrolyte/ion exchange membrane/acid electrolyte/MnO₂ electrode in combination.

The resulted battery has an open circuit voltage above 2.6V, and a working platform voltage above 2.4V. The resulted battery can be charged and discharged, with the charging voltage under 3V, and can be cycled stably for more than 1000 cycles.

Embodiment 3

The embodiment relates to a high voltage rechargeable Zn—MnO₂ battery, which has the structure of zinc electrode/alkaline electrolyte/ion exchange membrane/acid electrolyte/MnO₂ electrode. Its specific preparation steps are as follows.

1) Preparation of the zinc electrode, in which 80 g of zinc powder, 10 g of graphite, 10 g of polyvinylidene fluoride, 4 mL of N-methylpyrrolidone are uniformly mixed, and dried to obtain a zinc powder electrode.

2) Preparation of the alkaline gel electrolyte, in which 1 g of polyvinyl alcohol powder is dissolved in 30 mL of water, stirred at 95° C. for 3 hours, and then the mixture is added with 0.05 g of potassium persulfate powder, and retained at 65° C. for 15 minutes to obtain solution 1.

Another 10 g of acrylic acid is mixed with 10 g of sodium hydroxide solution with a mass fraction of 40 wt %, and the mixture is added with 0.05 g of NN'-methylenebisacrylamide, stirred evenly, resulting in solution 2.

The solutions 1, 2 are uniformly mixed, and retained at 75° C. by water bath for 3 hours to obtain a gel. The gel is then immersed in a lithium hydroxide solution with a mass fraction of 10 wt % for 24 hours to obtain a polyacrylic acid-polyvinyl alcohol-lithium hydroxide electrolyte having a lithium hydroxide concentration of 100 g/L.

3) Ion exchange membrane, in which the ion exchange membrane of the high voltage Zn—MnO₂ battery system of the present embodiment may be a proton exchange membrane, an anion exchange membrane, a cation exchange membrane or the like. Specifically, in the present embodiment, a sulfonic acid based proton exchange membrane is employed.

4) Preparation of the acidic liquid electrolyte, in which 10 g of sulfuric acid and 15 g of manganese sulfate monohydrate are dissolved in 100 mL of water to obtain an acidic liquid electrolyte.

5) Preparation of the MnO₂ electrode, in which 8 g of MnO₂ powder is uniformly mixed with 1 g of graphite powder and 1 g of polyvinylidene fluoride, and then the mixture is added with 0.4 g of 100 g/L sulfuric acid solution, stirred, and dried to serve as a MnO₂ electrode.

6) Battery assembly, in which the battery is formed in the structure of zinc electrode/alkaline electrolyte/ion exchange membrane/acid electrolyte/MnO₂ electrode in combination.

The resulted battery has an open circuit voltage above 2.6V, and a working platform voltage above 2.4V. The resulted battery is chargeable and dischargeable, with the charging voltage under 3V, and can be cycled stably for more than 100 cycles.

Embodiment 4

The embodiment relates to a high voltage rechargeable Zn—MnO₂ battery, which has the structure of zinc electrode/alkaline electrolyte/ion exchange membrane/acid electrolyte/MnO₂ electrode. Its specific preparation steps are as follows.

1) Preparation of the zinc electrode, in which 10 g of zinc powder is added to 4 g of potassium hydroxide solution with a mass fraction of 40 wt %, together with 0.04 g of sodium polyacrylate adhesive, and the mixture is stirred evenly, retained at room temperature for 12 hours to obtain a zinc paste electrode.

2) Preparation of the alkaline liquid electrolyte, in which 35 g of potassium hydroxide and 4 g of zinc acetate are dissolved in 100 mL of deionized water to obtain an alkaline liquid electrolyte.

3) Ion exchange membrane, in which the ion exchange membrane of the high voltage Zn—MnO₂ battery system of the present embodiment may be a proton exchange membrane, an anion exchange membrane, a cation exchange membrane or the like, and specifically in the present embodiment, a sulfonic acid based proton exchange membrane is employed.

4) Preparation of the acidic liquid electrolyte, in which 10 g of sulfuric acid and 15 g of manganese sulfate monohydrate are dissolved in 100 mL of water to obtain an acidic liquid electrolyte.

5) Preparation of the electrodeposited MnO₂ electrode, in which 20 g of manganese sulfate monohydrate and 20 g of sulfuric acid are dissolved in 100 mL of water, and a graphite sheet is employed as a working electrode and a counter electrode. Upon using a DC power source to deposit at 1.8V for 3600 seconds, the anode piece in the electrolytic cell is taken out, rinsed, and dried, thus resulting in an electrode-posited $MnO_2$ electrode.

6) Battery assembly, in which the battery is formed in a structure of zinc electrode/alkaline electrolyte/ion exchange membrane/acid electrolyte/$MnO_2$ electrode in combination.

Figure 2:
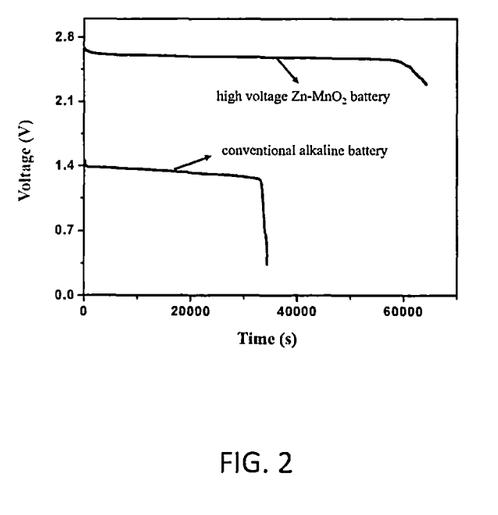
FIG. 2 is a schematic view showing a discharge curve of a high voltage rechargeable $Zn-MnO_2$ battery VS that of a conventional alkaline $Zn-MnO_2$ battery of the fourth embodiment.
Figure 3:
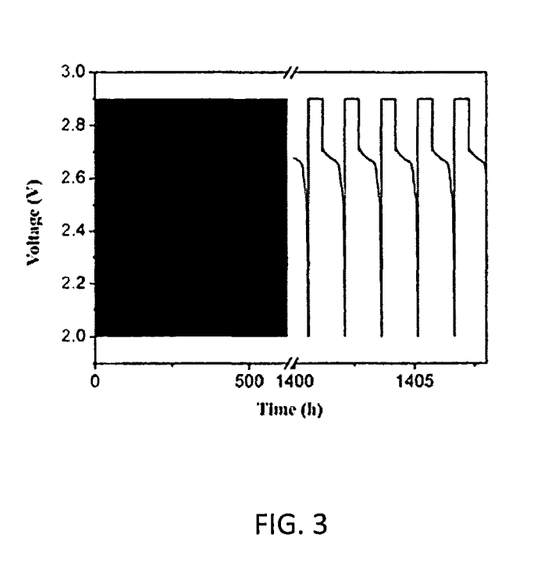
FIG. 3 is a charging and discharging curve of a high voltage rechargeable $Zn-MnO_2$ battery of the fourth embodiment.

As shown in FIG. 2, the resulted battery has an open circuit voltage above 2.7V, and a working platform voltage above 2.65V. As shown in FIG. 3, the resulted battery is chargeable and dischargeable, with the charging voltage under 3V, and can be cycled stably for more than 100 cycles.

Embodiment 5

The embodiment relates to a high voltage rechargeable Zn—$MnO_2$ battery, which has the structure of zinc electrode/alkaline electrolyte/ion exchange membrane/acid electrolyte/$MnO_2$ electrode. Its specific preparation steps are as follows.

1) Preparation of the zinc electrode, in which 10 g of zinc powder is added into 4 g of potassium hydroxide solution with a mass fraction of 40 wt %, together with 0.04 g of sodium polyacrylate adhesive, and the mixture is uniformly stirred, retained at room temperature for 12 hours, thus resulting in a zinc paste electrode.

2) 1 g of polyvinyl alcohol powder is dissolved in 30 mL of water, heated and stirred at 95° C. for 3 hours, and then the mixture is added with 0.05 g of potassium persulfate powder, and retained at 65° C. for 15 minutes to obtain solution 1.

Another 10 g of acrylic acid is mixed with 10 g of sodium hydroxide solution with a mass fraction of 40 wt %, and further added with 0.05 g of NN'-methylenebisacrylamide, and the mixture is stirred evenly, thus resulting in solution 2.

The solutions 1, 2 are uniformly mixed, and retained at 75° C. by water bath for 3 hours to obtain a gel. The gel is then immersed in 250 g/L potassium hydroxide+40 g/L zinc acetate solution for 24 hours to obtain a polyacrylic acid-polyvinyl alcohol-potassium hydroxide-zinc acetate electrolyte.

3) Ion exchange membrane, in which the ion exchange membrane of the high voltage Zn—$MnO_2$ battery system of the present embodiment may be a proton exchange membrane, an anion exchange membrane, a cation exchange membrane or the like, and specifically in the present embodiment, a sulfonic acid based proton exchange membrane is employed.

4) Preparation of the acidic gel electrolyte, in which 3 g of polyvinyl alcohol is heated and dissolved in 24 mL of water to form a uniform and stable solution, and then the solution is poured into 6 mL of 500 g/L sulfuric acid+250 g/L manganese sulfate monohydrate solution. After stirring evenly, the resulted solution is placed in a freezer. Then it is taken out to melt for use, resulting in a polyvinyl alcohol-sulfate-manganese sulfate electrolyte having a sulfuric acid concentration of 100 g/L in the liquid portion and a manganese sulfate concentration of 50 g/L.

5) Preparation of the $MnO_2$ electrode, in which 8 g of $MnO_2$ powder is uniformly mixed with 1 g of graphite powder and 1 g of polyvinylidene fluoride, and then the mixture is added with 0.4 g of a 100 g/L sulfuric acid solution, stirred, and dried to serve as a $MnO_2$ electrode.

6) Battery assembly, in which a battery is formed in a structure of zinc electrode/alkaline electrolyte/ion exchange membrane/acid electrolyte/$MnO_2$ electrode in combination.

The resulted battery has an open circuit voltage above 2.7 V, and a working platform voltage above 2.6 V. The resulted battery is chargeable and dischargeable, with the charging voltage under 3V, and can be cycled stably for more than 50 cycles.

Embodiment 6

The embodiment relates to a high voltage rechargeable Zn—$MnO_2$ battery, which has the structure of zinc electrode/alkaline electrolyte/ion exchange membrane/acid electrolyte/$MnO_2$ electrode. Its specific preparation steps are as follows.

1) Preparation of the zinc electrode, in which 80 g of zinc powder, 10 g of graphite, 10 g of polyvinylidene fluoride, 4 mL of N-methylpyrrolidone are uniformly mixed, and dried to obtain a zinc powder electrode.

2) Preparation of the alkaline gel electrolyte, in which 1 g of polyvinyl alcohol powder is dissolved in 30 mL of water, heated and stirred at 95° C. for 3 hours, then the mixture is added with 0.05 g of potassium persulfate powder, retained at 65° C. for 15 minutes to obtain solution 1.

Another 10 g of acrylic acid is mixed with 10 g of sodium hydroxide solution with a mass fraction of 40 wt %, and the mixture is added with 0.05 g of NN'-methylenebisacrylamide, stirred uniformly, to obtain solution 2.

The solutions 1, 2 are uniformly mixed, and retained at 75° C. by water bath for 3 hours to obtain a gel. The gel is then immersed in 250 g/L potassium hydroxide+40 g/L zinc acetate solution for 24 hours to obtain a polyacrylic acid-polyvinyl alcohol-potassium hydroxide-zinc acetate electrolyte.

3) Ion exchange membrane: the ion exchange membrane of the high voltage Zn—$MnO_2$ battery system of the present embodiment may be a proton exchange membrane, an anion exchange membrane, a cation exchange membrane or the like, and specifically in the present embodiment, a sulfonic acid based proton exchange membrane is employed.

4) Preparation of the acidic liquid electrolyte, in which 10 g of sulfuric acid and 15 g of manganese sulfate monohydrate are dissolved in 100 mL of water to obtain an acidic liquid electrolyte.

5) Preparation of the $MnO_2$ electrode, in which 8 g of $MnO_2$ powder is uniformly mixed with 1 g of graphite powder and 1 g of polyvinylidene fluoride, and then the mixture is added with 0.4 g of 100 g/L sulfuric acid solution, stirred, and dried to serve as the $MnO_2$ electrode.

6) Battery assembly, in which the battery is formed in the structure of zinc electrode/alkaline electrolyte/ion exchange membrane/acid electrolyte/$MnO_2$ electrode in combination.

The resulted battery has an open circuit voltage above 2.7 V, and a working platform voltage above 2.6 V. The resulted battery is chargeable and dischargeable, with the charging voltage under 3V, and can be cycled stably for more than 100 cycles.

Embodiment 7

The embodiment relates to a high voltage rechargeable Zn—$MnO_2$ battery, which has the structure of zinc electrode/alkaline electrolyte/ion exchange membrane/acid electrolyte/$MnO_2$ electrode. Its specific preparation steps are as follows.

1) Preparation of the zinc electrode, in which 10 g of zinc powder is added into 4 g of potassium hydroxide solution with a mass fraction of 40 wt %, together with 0.04 g of sodium polyacrylate adhesive, and the mixture is uniformly stirred, retained at room temperature for 12 hours to obtain the zinc paste electrode.

2) Preparation of the alkaline liquid electrolyte, in which 35 g of potassium hydroxide and 4 g of zinc acetate are dissolved in 100 mL of deionized water to obtain the alkaline liquid electrolyte.

3) Ion exchange membrane, in which the ion exchange membrane of the high voltage Zn—$MnO_2$ battery system of the present embodiment may be a proton exchange membrane, an anion exchange membrane, a cation exchange membrane or the like, and specifically in the present embodiment, a sulfonic acid based proton exchange membrane is employed.

4) Preparation of the acidic gel electrolyte, in which 3 g of polyvinyl alcohol is heated and dissolved in 24 mL of water to form a uniform and stable solution, and then it is poured into 6 mL of 500 g/L sulfuric acid+250 g/L manganese sulfate monohydrate solution. After stirring evenly, the resulted solution is placed in a freezer. Then it is taken out to melt for use, resulting in a polyvinyl alcohol-sulfate-manganese sulfate electrolyte having a sulfuric acid concentration of 100 g/L in the liquid portion and a manganese sulfate concentration of 50 g/L.

5) Preparation of the $MnO_2$ electrode, in which 8 g of $MnO_2$ powder is uniformly mixed with 1 g of graphite powder and 1 g of polyvinylidene fluoride, and then the mixture is added with 0.4 g of a 100 g/L sulfuric acid solution, stirred, and dried to serve as the $MnO_2$ electrode.

6) Battery assembly, in which the battery is formed in a structure of zinc electrode/alkaline electrolyte/ion exchange membrane/acid electrolyte/$MnO_2$ electrode in combination.

The resulted battery has an open circuit voltage above 2.7V, and a working platform voltage above 2.6V. The resulted battery is chargeable and dischargeable, with the charging voltage under 3V, and can be cycled stably for more than 100 cycles.

The specific embodiments of the present invention have been described above. It is to be understood that the invention is not limited to the specific embodiments described above, and various modifications and changes may be made by those skilled in the art without departing from the scope of the invention, which do not affect to the substantive content of the invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A rechargeable Zn—$MnO_2$ battery, wherein a structure of the Zn—$MnO_2$ battery comprises
   a zinc electrode;
   an alkaline electrolyte comprising an alkaline liquid electrolyte, wherein the alkaline liquid electrolyte comprises a concentration of an alkali metal hydroxide from 200 g/L to 600 g/L;
   an acid electrolyte comprising an acidic liquid electrolyte, wherein the acidic liquid electrolyte comprises an acid concentration of 50 g/L-300 g/L, and the acidic liquid electrolyte is an aqueous solution of 50 g/L-100 g/L sulfuric acid and 150 g/L-200 g/L manganese sulfate;
   an ion exchange membrane, added between the acid electrolyte and the alkaline electrolyte to limit the contact between hydrogen ions and hydroxyl ions, thereby ensuring a normal operation of the rechargeable Zn—$MnO_2$ battery; and
   a $MnO_2$ electrode in which $MnO_2$ powder is mixed with a conductive agent and an additive, thus achieving an open circuit voltage greater than 2.45V.

2. The rechargeable Zn—$MnO_2$ battery according to claim 1, wherein the zinc electrode is prepared by using a zinc foil, a zinc paste or zinc powder.

3. The rechargeable Zn—MnO2 battery according to claim 1, wherein the alkaline liquid electrolyte comprises a potassium hydroxide solution with an additive, and the additive comprises zinc oxide.

4. The rechargeable Zn—$MnO_2$ battery of claim 1, wherein said ion exchange membrane comprises a proton exchange membrane.

5. The rechargeable Zn—MnO2 battery according to claim 1, wherein the acidic liquid electrolyte comprises a sulfuric acid solution with an additive, and the additive comprises manganese sulfate.

6. The rechargeable Zn—$MnO_2$ battery according to claim 1, wherein the $MnO_2$ electrode comprises a $MnO_2$ powder electrode or an electrodeposited $MnO_2$ electrode.

7. The rechargeable Zn—$MnO_2$ battery according to claim 1, wherein the concentration of the alkali metal hydroxide in the alkali liquid electrolyte ranges from 300 g/L to 400 g/L and the acid concentration of the acidic liquid electrolyte ranges from 50 g/L to 100 g/L.

8. The rechargeable Zn—$MnO_2$ battery according to claim 1, wherein, in a discharge reaction of the rechargeable Zn—$MnO_2$ battery, $MnO_2$ molecules of the $MnO_2$ electrode are converted from +4 valence to +2 valence, thus each of the $MnO_2$ molecules releases two electrons, increasing an energy density of the $MnO_2$ electrode.

9. The rechargeable Zn—$MnO_2$ battery according to claim 7, wherein an electrode reaction of the MnO2 electrode in the acidic electrolyte is: positive electrode reaction: MnO2+4H++2e—=Mn2+2H2O, and a standard electrode potential for the positive electrode reaction is 1.224 V; in the alkaline electrolyte, the negative electrode reaction: Zn+2OH—=ZnO+H2O+2e—, and a standard electrode potential of the Zn electrode is −1.215V.

10. The rechargeable Zn—$MnO_2$ battery according to claim 1, wherein the ion exchange membrane comprises a sulfonic acid-based cation exchange membrane.

11. The rechargeable Zn—$MnO_2$ battery according to claim 1, wherein the $MnO_2$ electrode is prepared by uniformly mixing 8 g of $MnO_2$ powder with 1 g of graphite powder and 1 g of polyvinylidene fluoride to produce a first mixture, adding the first mixture to 0.4 g of a 100 g/L sulfuric acid solution to produce a second mixture, stirring the second mixture, and drying the second mixture to produce the MnO$_2$ electrode, thus the rechargeable Zn—MnO$_2$ battery has an open circuit voltage above 2.6V, has a working platform voltage above 2.4V, and with a charging voltage under 3V, is configured to be cycled stably for more than 50 cycles.

12. The rechargeable Zn—MnO$_2$ battery according to claim 1, wherein the zinc electrode is prepared by adding 10 g of zinc powder into 4 g of lithium hydroxide solution with a mass fraction of 20 wt %, together with 0.04 g of sodium polyacrylate adhesive to produce a first mixture, evenly stirring the first mixture and letting the first mixture stand at room temperature for 12 hours to obtain the zinc electrode, thus the rechargeable Zn—MnO$_2$ battery has an open circuit voltage above 2.6V, has a working platform voltage above 2.4V, and with a charging voltage under 3V, is configured to be cycled stably for more than 100 cycles.

13. The rechargeable Zn—MnO$_2$ battery according to claim 1, wherein the MnO$_2$ electrode is prepared by dissolving 20 g of manganese sulfate monohydrate and 20 g of sulfuric acid in 100 mL of water, using a graphite sheet as a working electrode and a counter electrode, depositing, via a DC power source, at 1.8V for 3600 seconds thus producing an anode piece, and removing, rinsing, and drying the anode piece to produce the MnO$_2$ electrode, thus the rechargeable Zn—MnO$_2$ battery has an open circuit voltage above 2.6V, has a working platform voltage above 2.4V, and with a charging voltage under 3V, is configured to be cycled stably for more than 100 cycles.

14. The rechargeable Zn—MnO$_2$ battery according to claim 1, wherein the acidic liquid electrolyte is prepared by dissolving 10 g of sulfuric acid and 15 g of manganese sulfate monohydrate in 100 mL of water to obtain the acidic liquid electrolyte, thus the rechargeable Zn—MnO$_2$ battery has an open circuit voltage above 2.6V, has a working platform voltage above 2.4V, and with a charging voltage under 3V, is configured to be cycled stably for more than 100 cycles.

15. The rechargeable Zn—MnO$_2$ battery according to claim 1, wherein the ion exchange membrane comprises a sulfonic acid based proton exchange membrane.

16. The rechargeable Zn—MnO$_2$ battery according to claim 1, wherein the zinc electrode is prepared by uniformly mixing 80 g of zinc powder, 10 g of graphite, 10 g of polyvinylidene fluoride, 4 mL of N-methylpyrrolidone to obtain a first mixture, and drying the first mixture to obtain a zinc powder electrode, thus the rechargeable Zn—MnO$_2$ battery has an open circuit voltage above 2.7V, has a working platform voltage above 2.6V, and with a charging voltage under 3V, is configured to be cycled stably for more than 100 cycles.

\* \* \* \* \*